Oct. 15, 1963 M. J. LAYMAN 3,106,886
BARBECUE DRIP PAN
Filed Jan. 21, 1959

MEREDITH J. LAYMAN
INVENTOR.

BY Lyon & Lyon
ATTORNEYS

United States Patent Office 3,106,886
Patented Oct. 15, 1963

3,106,886
BARBECUE DRIP PAN
Meredith J. Layman, 1361 Woodland Ave., Chico, Calif.
Filed Jan. 21, 1959, Ser. No. 788,141
5 Claims. (Cl. 99—421)

The present invention relates to a device adapted to be used in combination with a spit type barbecue brazier and more particularly to such a device adapted to be adjustably positioned with respect to the rotating spit of a conventional brazier.

It is an object of this invention to provide a barbecue drip pan adapted to be used in combination with a barbecue brazier having a rotatable spit which would require no modification of conventional braziers.

It is a further object of this invention to provide such a pan which may be located in one of a plurality of positions relative to the rotating spit.

It is a more particular object of this invention to provide such a pan which, when used in combination with a conventional barbecue brazier, permits the simultaneous use of both the spit and the grill.

Other objects and advantages of this invention will, it is believed, be readily apparent to those skilled in the art from the following detailed description of a preferred embodiment thereof when taken in connection with the accompanying drawings in which FIGURE 1 is a side elevation in section of a conventional brazier modified in accordance with the present invention.

Figure 1:
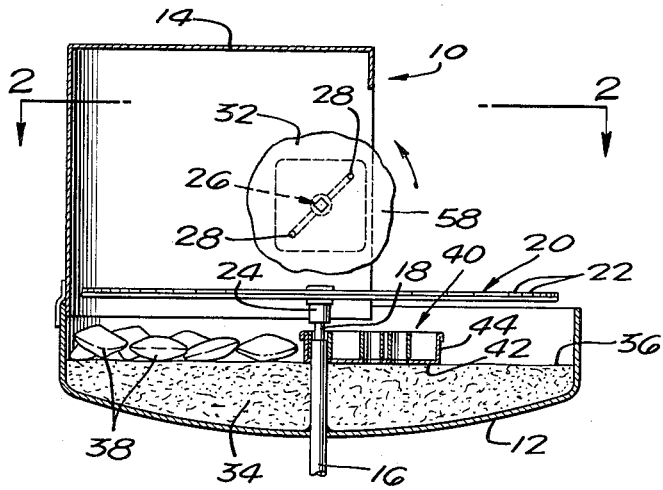

Referring now to the drawings, a conventional brazier is illustrated generally at 10. The brazier includes a fire bowl 12 which may be hemispherical or hemispheroidal in shape and a wind protector hood 14 suitably mounted on the fire bowl 12. The fire bowl is provided with a centrally positioned sleeve 16 which carries a movable shaft 18. Mounted on the end of the shaft 18 is a grill plate 20. The grill plate 20 is provided with a plurality of parallel support members 22 and a centrally positioned cup 24. The cup fits over the end of the shaft 18, the shaft being adjustable with respect to the fire bowl 12 to position the grill plate 20. The hood 14 carries a spit 26 provided with a pair of oppositely disposed forked elements 28. The spit is provided with a suitable driving force indicated generally at 30 and lies parallel to the grill plate 20 and approximately centrally positioned with respect thereto. The spit 26 is thus adapted to hold a piece of meat 32 and to rotate it with respect to the fire bowl 12.

When in use, the fire bowl 12 is conventionally filled with a layer of sand 34 which is smoothed out to give a uniform upper surface 36. Heat is provided by conventional briquettes 38 lying upon the surface of the sand. In order to achieve a maximum efficiency in cooking, the briquettes are conventionally placed within the area protected by the hood as shown in FIGURE 1 so that the meat 32 is cooked both by direct and reflected heat.

The device thus far described is conventional and forms no part of the present invention. In the use of such conventional devices the cooking meat exudes grease and other drippings which fall into the fire bowl and contaminate the sand. In addition, the dripping grease falls on the hot briquettes causing sputtering and destroying the uniform heating qualities of the otherwise stable fire bed.

While attempts have been made to provide spit type barbecues with a drip pan to prevent contamination of the sand and the grease from falling on the hot briquettes, these devices require conventionally extensive modifications to the existing brazier. In addition, such devices prevent simultaneous use of both the grill portion and the spit portion of the barbecue.

In accordance with the present invention, I have provided a pan which may be readily used in connection with a conventional brazier as described without any modification whatsoever.

My drip pan comprises an elongated generally rectangular pan portion 40 having a bottom 42 and raised edges 44. The pan is proportioned so as to be adapted to be positioned within the fire bowl. The precise length, width and depth of the pan will be determined by the size of the particular brazier with which it is to be used.

In order to be substantially uniformly in use, the dimensions of the pan I have found to be most ideal for a particular size of brazier are approximately as follows: the length should be approximately one and one-half times the horizontal radius of the fire bowl, the width should be approximately half of the horizontal radius of the fire bowl, and the depth should be approximately one and one-half inches. A pan with these dimensions will fit readily within the fire bowl on the surface 36 of the sand and be long enough to catch the drippings from the end of the majority of meat pieces which could be placed on the spit and be wide enough to extend beyond the edge of the rotating piece of meat but not so wide as to completely cover the sand portion beneath the grill plate 22.

Figure 3:
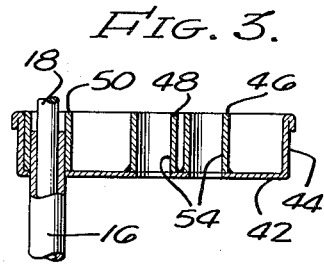
FIGURE 3 is an enlarged sectional view of the barbecue drip pan as mounted upon the center sleeve of a conventional brazier.
Figure 2:
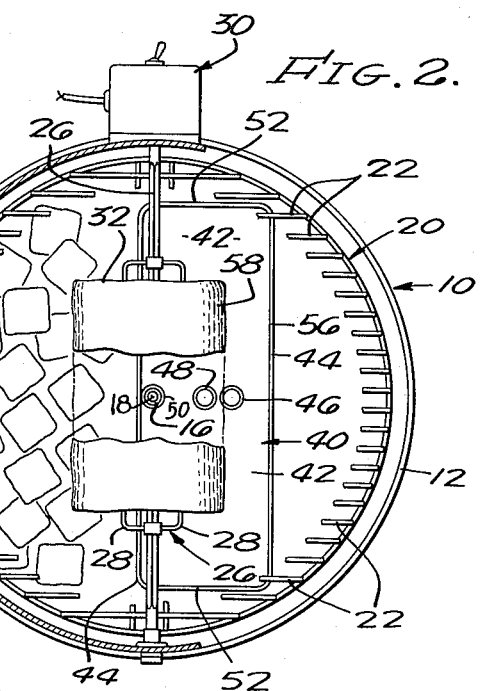
FIGURE 2 is a partial sectional view taken substantially along the line 2—2 of FIGURE 1.

As shown in FIGURES 1 through 3 inclusive, the pan is provided with a plurality of laterally displaced sleeves 46, 48 and 50. These sleeves extend upwardly from the bottom 42 and parallel the raised edges 44. The sleeves are further positioned equal distance from either end 52 of the pan. The bottom of the pan is provided with suitable openings at each sleeve for cooperating therewith to provide an axial bore 54 within each of the sleeves extending completely through the pan. These sleeves are in diameter sufficient to slidably receive the sleeve 16 of the brazier. The sleeve 48 is centrally positioned with respect to the sides 56 of the pan while the sleeve 46 is positioned at a point so that its central axis intersects the base one-third of the width of the pan from one side. The sleeve 50 is positioned on the other side of the sleeve 48 adjacent the side 56 of the pan. By this construction the pan may be placed in any one of five lateral positions as viewed in FIGURE 1 relative to the spit 26, being adaptable therefore to the size of the piece of meat being cooked. One position is shown in FIGURE 1 with pan 40 in the extreme right position. The second and extreme left position is with sleeve 50 of the pan positioned on sleeve 16 of the brazier and may be visualized by considering the pan 40 to be revolved 180° about the axis of sleeve 16 as viewed in FIGURES 1 or 2. The third and intermediate position is with sleeve 48 of the pan slidably engaging sleeve 16 of the brazier. The fourth and fifth positions are between these extreme positions and the intermediate position when sleeve 46 of the pan slidably engages sleeve 16 of the brazier and the pan is revolved 180° between the two positions in the same manner as the difference in the first two described positions.

In the use of the device thus described, the grill plate 20 is removed from the brazier, the sand layer 34 placed in the fire bowl 12, and the briquettes 28 placed on the surface 36 of the sand. The pan is then placed within the fire bowl, one of the sleeves 46, 48 or 50 slidably engaging the sleeve 16 of the brazier. The precise sleeve to be used and orientation of the pan is determined by the size of the meat to be cooked. The grill plate 20 is then returned to position, the cup 24 being placed over the boss 18. The meat on the spit is then rotated in the direction shown in FIGURE 1 and the cooking process started. While it is true that the greatest quantity of meat juices will probably exude from the side of the meat that is closest to the fire or heat, due to the direction of rotation of the spit 26, this is the side of the meat that is moving downwardly. The meat juices will tend to drop by gravity from the meat but on the downwardly moving side of the meat the downward velocity of the surface of the meat will tend to correspond to the downward velocity of the juices induced by gravity and therefore the juices will tend to adhere to the surface of the meat. However, on the upwardly moving side 58 of the meat the surface velocity of the meat is opposed by the downward velocity of the juices induced by gravity and therefore the juices will tend to separate from the meat. Thus the vast majority of the drippings will come from the side 58 of the meat and, as shown in FIGURE 2, will be caught by the pan.

If desired, briquettes may be placed in the area beneath the grill 20 beside the pan 40 and the grill utilized in cooking.

Figure 5:
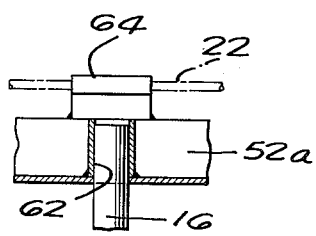
FIGURE 5 is a sectional view taken substantially along the line 5—5 of FIGURE 4, illustrating the modified pan supported by the grill.
Figure 4:
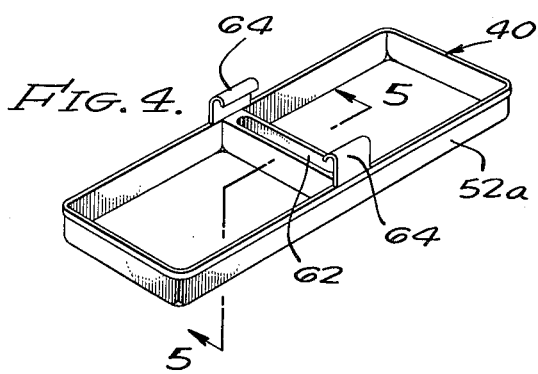
FIGURE 4 is a perspective view of a modification of the barbecue drip pan.

A modified version of the barbecue drip pan is indicated in FIGURES 4 and 5. In this modification the pan 40a is provided with a centrally postioned transverse slot 62. The slot is adapted to slidably receive the sleeve 16 of the brazier and/or the cup 24 of the grill plate 20. The sides 56a of the pan 40a are provided with a pair of oppositely disposed centrally positioned generally U-shaped brackets 64 adapted to engage the rod-like support members 22 and of the plate 20.

As shown in FIGURE 5, the pan 40a is suspended beneath the plate 20 and carried by the members 22. This pan can be positioned at any desired location beneath the spit and may be used in a manner similar to the preferred embodiment.

Having fully described my invention, it is to be understood that I do not wish to be limited to the details set forth, but my invention is of the full scope of the appended claims.

I claim:

1. For use with a barbecue brazier having a fire bowl, a rotatable spit suspended over the fire bowl, a centrally positioned sleeve carried by said fire bowl, a movable shaft within said sleeve and a grill plate positioned within the fire bowl and carried by the movable shaft; a drip pan adapted for installation under the grill plate, said drip pan comprising: an elongated, generally rectangular pan portion having a bottom and raised edges; said bottom being provided with a centrally positioned transverse slot having upstanding walls extending substantially the width of said bottom and being adapted to slidably receive said sleeve; and a pair of oppositely disposed centrally positioned generally U-shaped brackets carried by a pair of said raised edges, said brackets being adapted to engage the grill plate at one of a plurality of positions whereby said pan may be selectively positioned beneath said rotatable spit.

2. In a barbecue brazier having a fire bowl, a rotatable spit suspended over the fire bowl, a centrally positioned sleeve carried by said fire bowl, a movable shaft within said sleeve and a grill plate positioned within the fire bowl and carried by said movable shaft, the improvement comprising, in combination: a drip pan having an elongated, generally rectangular pan portion, said pan portion having a bottom and raised edges; said bottom being provided with a centrally positioned transverse slot slidably receiving said sleeve, said transverse slot having upstanding walls and extending substantially the width of said bottom; and a pair of oppositely disposed centrally positioned generally U-shaped brackets carried by a pair of said raised edges, said brackets engaging the grill plate at one of a plurality of positions whereby said pan may be selectively positioned beneath said rotatable spit.

3. A barbecue brazier assembly comprising: a fire bowl, a rotatable spit extending over the fire bowl, a centrally postioned vertical sleeve carried by said fire bowl, a movable shaft within said sleeve, a grill plate positioned below the spit and carried by the movable shaft, a drip pan positioned under said grill plate, said drip pan having a generally rectangular pan portion, said pan portion having a bottom and two pairs of oppositely disposed raised edges defining a fluid-receiving well, and a plurality of upstanding sleeve members mounted in sealing relationship with said bottom and rising generally perpendicular to said bottom, said sleeve members positioned in a centrally located row across the shorter dimension of said rectangular pan portion, each of said sleeve members having an internal diameter substantially equal to the outside diameter of said centrally positioned sleeve, one of said sleeve members being removably and slidably positioned on said centrally positioned sleeve whereby said sleeve members are selectively slidably receivable on said centrally positioned sleeve to prevent passage of excessive quantities of fluids through the annular opening between the inside of said sleeve members and the outside of said centrally positioned sleeve and whereby said pan may be positioned in one of a plurality of positions in lateral relationship with respect to said rotatable spit.

4. A barbecue brazier comprising: a fire bowl, a rotatable spit extending over the fire bowl, a centrally positioned vertical sleeve carried by said fire bowl, a movable shaft within said sleeve, a grill plate positioned below the spit and carried by said movable shaft, a drip pan having an elongated generally rectangular pan portion, said pan portion having a bottom and two pairs of oppositely disposed raised edges to define a fluid-receiving well, and three upstanding sleeve members mounted on and rising from said bottom, each of said sleeve members being positioned substantially equidistant between a first pair of said raised edges, a first of said sleeve members being further positioned equidistant between the second pair of said raised edges, a second of said sleeve members being further positioned adjacent one of said raised edges of said second pair of raised edges, a third sleeve member being further positioned one third of the distance between said second pair of raised edges, each of said sleeve members having an internal diameter substantially equal to the external diameter of said centrally positioned sleeve and one of said sleeve members being removably and slidably positioned on said centrally positioned sleeve and supported thereon whereby said pan may be slidably received by said centrally positioned sleeve in one of a plurality of positions in lateral relationship with respect to said rotatable spit.

5. A barbecue brazier comprising: a fire bowl, a rotatable spit extending over the fire bowl, a centrally positioned vertical sleeve carried by said fire bowl, a movable shaft within said sleeve, a grill plate positioned below the spit and carried by the movable shaft, a drip pan having an elongated generally rectangular pan portion, said pan portion having a bottom and two pairs of oppositely disposed raised edges to define a fluid-receiving well, three upstanding sleeve members mounted on top of and in sealing relation with said bottom, each of said sleeve members being positioned substantially equidistant between the first pair of said raised edges, a first of said sleeve members being further positioned equidistant between the second pair of raised edges, a second of said sleeve members being further positioned adjacent one of said second pair of raised edges, a third sleeve member being positioned one third of the distance between said second pair of raised edges, said sleeve members and said two pairs of raised edges rising substantially the same distance above said bottom, each of said sleeve members having an internal diameter substantially equal to the external diameter of said centrally positioned sleeve and one of said sleeve members being removably and slidably positioned on said centrally positioned sleeve and supported thereon whereby said pan may be slidably received by said centrally positioned sleeve in one of a plurality of positions with respect to said rotatable spit.

References Cited in the file of this patent
UNITED STATES PATENTS

| | | |
|---|---|---|
| 1,204,172 | McLaughlin | Nov. 7, 1916 |
| 2,103,426 | Le Masson | Dec. 28, 1937 |
| 2,307,914 | Bitney | Jan. 12, 1943 |
| 2,498,502 | O'Brien | Feb. 21, 1950 |
| 2,573,115 | Sisto | Oct. 30, 1951 |
| 2,629,315 | Schaar | Feb. 24, 1953 |
| 2,715,870 | Rutkowski | Aug. 23, 1955 |
| 2,718,845 | Dudley | Sept. 27, 1955 |
| 2,797,633 | Goodwin | July 2, 1957 |
| 2,819,667 | Victor | Jan. 14, 1958 |
| 2,894,447 | Persinger | July 14, 1959 |
| 2,935,221 | Mitchell | May 3, 1960 |